Aug. 16, 1960      I. H. FOWLE      2,948,975

COLOR SLIDE VIEWING ACCESSORY

Filed Nov. 13, 1957

INVENTOR.
IRVING H. FOWLE
BY

ATTORNEYS 2,948,975
Patented Aug. 16, 1960

2,948,975
COLOR SLIDE VIEWING ACCESSORY

Irving H. Fowle, Binghamton, N.Y., assignor to General Aniline & Film Corporation, New York, N.Y., a corporation of Delaware Filed Nov. 13, 1957, Ser. No. 696,086

1 Claim. (Cl. 40—106.1)

This invention relates to a viewer for photographic color transparencies and, more particularly, to a simple viewer that is collapsible so that it may be folded and placed within a container along with color slides.

Color slides of the popular 35 mm. size have a small format which requires proper illumination to be viewed by the naked eye. As a matter of fact, such transparencies are generally projected at home for the enjoyment of all. However, it is the natural curiosity of all, when receiving a package of slides from the processing establishment, to give a first look by taking them out and viewing them the best they can in front of a window or lamp. This means of preliminary viewing seldom gives adequate lighting for the picture nor can the interfering outside light be excluded.

As an aid to such viewing, various types of hand viewers are available. These generally comprise a box of plastic or metal construction accommodating a single slide and often including a light source and battery. These viewers, while not costly, nonetheless represent a small investment. Aside from that, they are of a size not too convenient to carry on one's person and, in most instances, are not at hand when the carton of slides arrives from the processing establishment.

It is an object of this invention to provide a slide viewer which is collapsible and may be folded and thus conveniently packaged together, as an accessory, with the processed film slides in the carton in which such slides are delivered.

A further object of this invention is to provide a viewer that is quickly and easily assembled for immediate use.

A particular feature of this invention is to provide a viewer that is simple to manufacture and inexpensive enough to include in a package of slides so that it may be discarded after use.

Other objects and features will be apparent from the following description of the invention pointed out in particularity in the appended claim and taken in connection with the accompanying drawing, in which:

Figure 1:
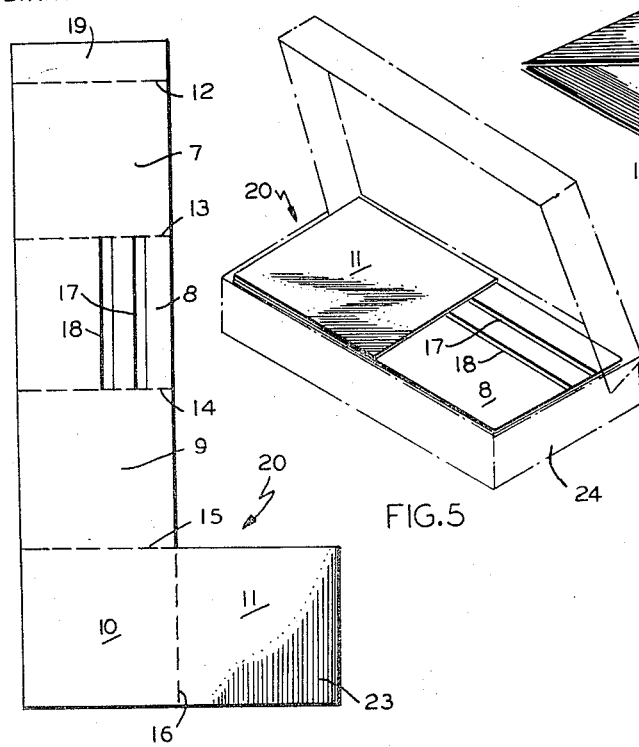
Fig. 1 is an illustration showing a blank form of the material.
Figure 5:
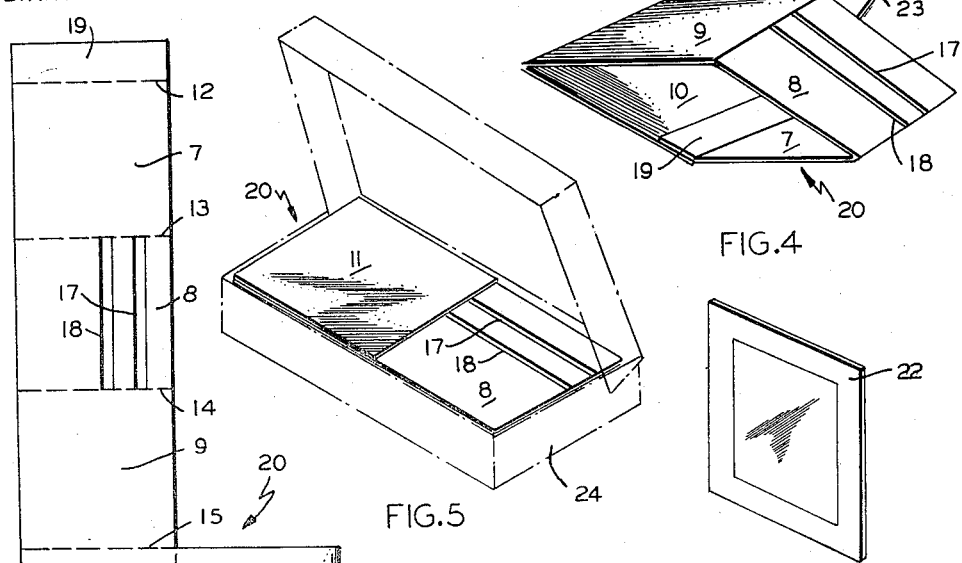
Fig. 5 is a perspective view illustrating the viewer in collapsed form, packaged with color slides.
Figure 6:
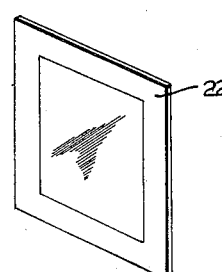
Fig. 6 is a perspective view of the diffusing screen.

Referring now to the drawing, and particularly Fig. 1, it is seen that the viewing device may simply be made from a sheet of cardboard or similar material cut in blank form consisting of sections 7, 8, 9, 10 and 11 divided by scorings 12, 13, 14, 15 and 16 to be folded therealong for assembly. Section 8 has two parallel cutouts 17 and 18 of such width as to accommodate the paper mounts in which color slides are furnished, as will be explained later.

Figures 2, 3:
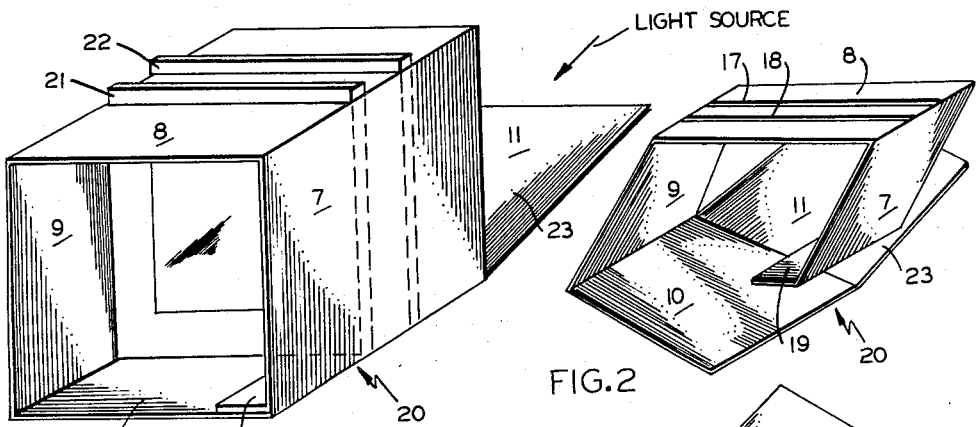
Fig. 2 is a perspective view of the viewer folded prior to final assembly operation.
Fig. 3 is a perspective view illustrating the slide viewer erected and ready for use.
Figure 4:
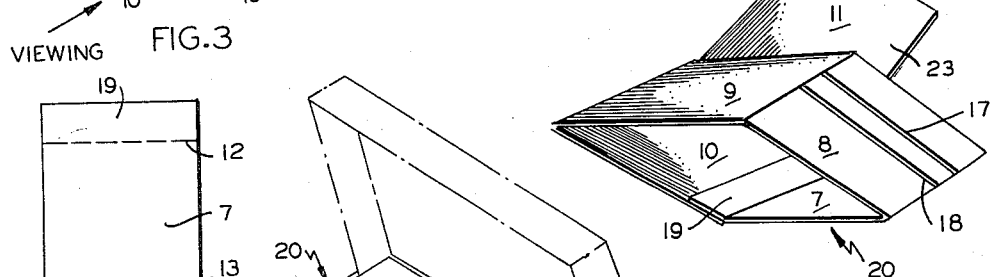
Fig. 4 is a perspective view illustrating the viewer partially collapsed.

In order to form the structure as shown in Figs. 2 and 4, the portion 19 of section 7 is glued or fastened in any suitable manner to the inner side of section 10. This assembly results in a collapsible structure which may easily be erected by hand. The viewer, generally indicated by reference character 20, as shown in Fig. 3, is placed in operation by simply erecting the assembled structure. The sections indicated in Fig. 1 thus become the side, top and bottom walls thereof.

The slide 21 to be viewed is inserted into slot 18 and a diffusing screen 22 in slot 17. The diffusing screen 22 is identical in shape and form with conventional color slides except that in place of the film, a translucent, frosted-glass-like material is provided for diffusing the light reaching the slide 21.

It is to be noted that when the diffusing screen and the slide are placed into the viewer, they also serve the purpose of maintaining the structure in its erected condition ready for use.

For the purpose of concentrating light upon the slide 21, the inner face of wall section 11 has a mirrored surface which may be obtained by spraying or by covering it with a silver foil 23. The section 11 thus becomes a reflector which may be positioned in any angular relationship for reflecting incident daylight or artificial light onto the diffusing screen 22. The front portion of the viewer, formed by the walls 7, 8 and 9 define the viewing opening 10, providing sufficient shade to exclude extraneous light for viewing the color slide mainly from the light source obtained by the reflecting surface 11.

It was mentioned before, that when not in use the viewer may be folded flat, as seen in Fig. 4 partially collapsed, and the reflector 11 folded over wall section 9. In this manner, it can easily be placed into the carton 24 containing the color slides. The diffusing screen 22 may also be provided with the viewing device placed in the same package with the color slides.

I claim:

A collapsible viewing device for photographic transparencies which are placed in cardboard mounts and packed in a container for shipment comprising rectangular top, bottom and side walls formed of a single piece of flexible material bent along scorings therein to form an open ended rectangular hollow structure when in the erect position and a flat structure when collapsed, a pair of adjacent cutouts in one of said walls each of a size to accommodate one slide mount, a rectangular projection extending from and integral with one of said walls at one end of the structure, the flexible material having a score line at the juncture of the projection and the wall from which it extends whereby said projection may be positioned at an angle to the wall from which it extends, said projection having a light reflecting surface whereby when said projection is positioned at an angle to the wall from which it extends said light reflecting surface will reflect incident light falling thereon axially into the interior of said hollow structure for viewing a transparency and a removable diffusing screen of substantially the same size as the slide mount, positioned in one of said pair of cutouts between the slide mount and the reflecting surface, whereby the structure may be erected from its collapsed condition by pressing opposite edges thereof and the structure will be maintained in its erect condition by placing a slide mount in the cutout.

References Cited in the file of this patent

UNITED STATES PATENTS

| | | |
|---|---|---|
| 1,024,613 | Berger | Apr. 30, 1912 |
| 2,580,164 | Flynn | Dec. 25, 1951 |
| 2,601,619 | Loomis | June 24, 1952 |
| 2,785,485 | Cameron | Mar. 19, 1957 |
| 2,809,452 | Brown | Oct. 15, 1957 |

FOREIGN PATENTS

| | | |
|---|---|---|
| 1,099,211 | France | Aug. 31, 1955 |